(12) United States Patent
Yang et al.

(10) Patent No.: US 8,157,729 B2
(45) Date of Patent: Apr. 17, 2012

(54) SYSTEM, METHOD AND MEDIUM EDITING MOVING PICTURES USING BIOMETRIC SIGNALS

(75) Inventors: Gyung-hye Yang, Yongin-si (KR); Ki-wan Choi, Yongin-si (KR); Seung-Nyung Chung, Yongin-si (KR); Youn-ho Kim, Yongin-si (KR); Yong-beom Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 959 days.

(21) Appl. No.: 11/715,907

(22) Filed: Mar. 9, 2007

(65) Prior Publication Data

US 2007/0263978 A1    Nov. 15, 2007

(30) Foreign Application Priority Data

May 9, 2006  (KR) .................. 10-2006-0041704

(51) Int. Cl.
  *A61B 5/00*  (2006.01)
(52) U.S. Cl. ................. 600/300; 386/278; 386/E5.003
(58) Field of Classification Search .................. 600/300, 600/301; 128/903–905, 920; 386/278, E5.003, 386/52
  See application file for complete search history.

(56) References Cited

U.S. PATENT DOCUMENTS

| 6,585,521 B1 | 7/2003 | Obrador | |
| 2003/0117485 A1* | 6/2003 | Mochizuki et al. | 348/14.01 |
| 2003/0118974 A1 | 6/2003 | Obrador | |
| 2003/0131351 A1 | 7/2003 | Shapira | |
| 2003/0139654 A1* | 7/2003 | Kim et al. | 600/300 |
| 2003/0166996 A1* | 9/2003 | Kim et al. | 600/300 |

FOREIGN PATENT DOCUMENTS

| JP | 2002-204419 | 7/2002 |
| JP | 2004-159192 | 6/2004 |
| JP | 2005-128884 | 5/2005 |
| KR | 2000-0040713 | 7/2000 |
| KR | 10-2005-0033450 | 4/2005 |
| KR | 2005-0044899 | 5/2005 |

OTHER PUBLICATIONS

Korean Office Action for corresponding Korean Patent Application No. 10-2006-0041704 dated Aug. 24, 2007 (4 pgs).

* cited by examiner

*Primary Examiner* — Henry M Johnson, III
*Assistant Examiner* — Kai Rajan
(74) *Attorney, Agent, or Firm* — Staas & Halsey LLP

(57) ABSTRACT

A system, method and medium editing a moving picture using biometric signals is provided. The system includes a biometric signal generation module to measure signals that reflect an emotional state of a user while capturing a moving picture, and to generate a first and a second biometric signal based on the measured signals, an event section extraction module to extract a first event section that reflects preferences of the user from a playback section of the moving picture based on the first biometric signal, extract a second event section that reflects preferences of the user from the playback section of the moving picture based on a second biometric signal, and extract a final event section based on the first and second event sections, and an indexing module to edit the moving picture by indexing the final event section in synchronization with the playback section of the moving picture.

28 Claims, 9 Drawing Sheets

SYSTEM, METHOD AND MEDIUM EDITING MOVING PICTURES USING BIOMETRIC SIGNALS

CROSS-REFERENCE TO RELATED APPLICATIONS

This application claims priority from Korean Patent Application No. 10-2006-0041704 filed on May 9, 2006 in the Korean Intellectual Property Office, the disclosure of which is incorporated herein by reference in its entirety.

BACKGROUND

1. Field

One or more embodiments of the present invention relate to a system, method and medium for editing a moving picture using biometric signals, and more particularly, to a system, method and medium for editing a moving picture using biometric signals, in which an event section that reflects a user's preferences is created using biometric signals that are detected from the user using two types of sensors with the event section being indexed in synchronization with a playback section of a moving picture captured by the user.

2. Description of the Related Art

Portable moving image recording/reproducing apparatuses such as camcorders, digital cameras, and portable terminals not only can capture still/moving images of subjects but also can record the captured still/moving images. Thus, users of such portable moving image recording/reproducing apparatuses can capture images of a variety of subjects and record the captured images even when moving from one place to another, and can reproduce, and later play back the recorded images. Users may also use display devices embedded in moving image recording/reproducing apparatuses, personal computer (PC) monitors, or other external display devices such as television (TV) monitors to watch moving images recorded by the portable moving image recording/reproducing apparatuses.

Since it generally takes significant time to watch all of the moving images recorded by users, the users are likely to edit the recorded moving images by choosing only those images that are relatively meaningful. During the editing of the moving images, the user may detect their emotions or biometric signals as they watch the recorded moving images and then index the recorded moving images using the detected emotions or biometric signals so that the recorded moving images can be selectively watched later by people other than the users according to the results of the indexing. Examples of such multimedia data edition technique are discussed in U.S. Patent Published Application No. 2003-0131351 and U.S. Pat. No. 6,585,521. These conventional multimedia data edition techniques, however, do not provide ways to choose moving images that are deemed meaningful to users according to the users' emotional/physical state information. In addition, the extraction of biometric signals that reflect users' emotional states generally requires a long sensing period and is complex due to the need to combine a variety of signals obtained as a result of the sensing. In this regard, the aforementioned conventional multimedia data editing methods fail to specify how to provide an optimum combination of sensors that suits a user's demands or a simple array of sensors that can optimally perform a sensing operation.

In addition, in the case of a single measurement system using a photoplethysmography (PPG) sensor, a problem must also be addressed arising from the fact that an event section containing meaningful data may be removed when noise, created due to the inherent properties of a PPG sensor, is removed.

SUMMARY

One or more embodiments of the present invention provide a system, method and medium editing a moving picture using biometric signals in which an event section included in a noise section can be effectively restored by enhancing the performance of the extraction of an event section mixedly using two types of sensors that are complementary to each other, thereby realizing a high-quality sensing system capable of properly filtering out noise.

One or more embodiments of the present invention also provide a system, method and medium for editing a moving picture using biometric signals in which a user event section can be created by estimating a noise section using a photoplethysmography (PPG) sensor and a galvanic skin response (GSR) sensor, respectively, and a final event section can be created by prioritizing a plurality of extracted event sections.

Additional aspects and/or advantages of the invention will be set forth in part in the description which follows and, in part, will be apparent from the description, or may be learned by practice of the invention.

To achieve at least the above and/or other aspects and advantage, embodiments of the present invention include a system editing a moving picture using biometric signals. The system includes a biometric signal generation module to measure signals that reflect an emotional state of a user while capturing a moving picture, and to generate a first and a second biometric signal based on the measured signals, an event section extraction module to extract a first event section that reflects preferences of the user from a playback section of the moving picture based on the first biometric signal, extract a second event section that reflects preferences of the user from the playback section of the moving picture based on a second biometric signal, and extract a final event section based on the first and second event sections, and an indexing module to edit the moving picture by indexing the final event section in synchronization with the playback section of the moving picture.

To achieve at least the above and/or other aspects and advantage, embodiments of the present invention include a method of editing a moving picture using biometric signals. The method includes measuring signals that reflect an emotional state of a user while capturing a moving picture, generating a first and a second biometric signal based on the measured signals, extracting a first event section that reflects preferences of the user from a playback section of the moving picture based on the first biometric signal, extracting a second event section that reflects preferences of the user from the playback section of the moving picture based on the second biometric signal, extracting a final event section based on the first and second event sections, and editing the moving picture by indexing the final event section in synchronization with the playback section of the moving picture.

To achieve at least the above and/or other aspects and advantage, embodiments of the present invention include a method indexing a moving picture during capture of the moving picture. The method includes encoding one or more segments of the moving picture, during a capture of the picture by a user, with one or more biometric signals obtained from the user during the capture of the picture, and automatically playing back an event section comprising only selected segments of the captured moving picture, the segments being selected according to a pre-determined algorithm using the encoded one or more biometric signals.

To achieve at least the above and/or other aspects and advantage, embodiments of the present invention include a portable video recording device having sensors for detecting an emotional state of a user. The device includes a video capturing unit to capture video, a first biometric signal detector, attached to a first exterior portion of the device, generating a first biometric signal that is synchronized with the captured video, and a second biometric signal detector, attached to a second exterior portion of the device, generating a second biometric signal that is synchronized with the captured video.

BRIEF DESCRIPTION OF THE DRAWINGS

These and/or other aspects and advantages of the invention will become apparent and more readily appreciated from the following description of embodiments, taken in conjunction with the accompanying drawings of which.

DETAILED DESCRIPTION OF EMBODIMENTS

Figure 1:
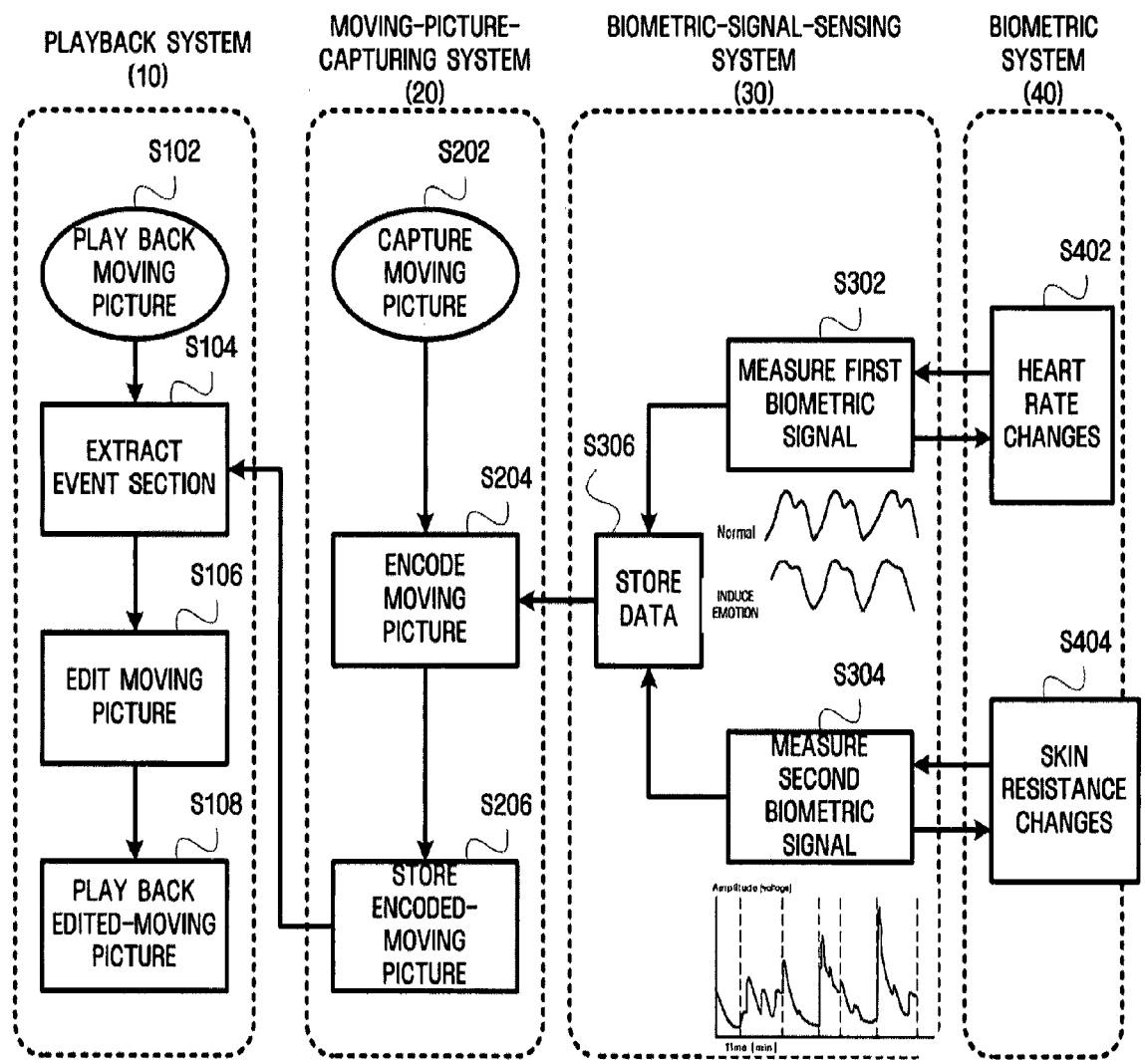
FIG. 1 illustrates a biometric system editing a moving picture using biometric signals according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

FIG. 1 illustrates a biometric system 40 editing a moving picture using biometric signals according to an embodiment of the present invention. Within FIG. 1, each illustrated system component has also been illustrated with corresponding operations for accomplishing each system component's goal. For example, operations S102-S108 are illustrated within the illustrated playback system. Therefore, referring to FIG. 1, variations in the emotional state of a user while the user captures a moving picture are represented by biometric signals detected from the user. According to one or more embodiments of the present embodiment, a measured variation in heart rate measured in operation S402 may be used as a first biometric signal, and a measured variation in skin resistance, measured in operation S404 may be used to as a second biometric signal, for example.

In the illustrated operation S302 of a biometric signal sensing system 30, if an event that draws the user's attention occurs during the capturing of the moving picture and thus the heart rate of the user changes as measured, in operation S402, the biometric signal sensing system 30 may detect the change in the heart rate of the user as a first biometric signal. In operation S304, if the skin resistance of the user changes as measured, in operation S404, the biometric signal sensing system 30 may detect the change in the skin resistance of the user as a second biometric signal. In operation S306, the biometric signal sensing system 30 stores the first biometric signal and the second biometric signal. The detection and sensing of biometric signals will be described later in more detail with reference to FIGS. 3 and 4. Though aspects of the present invention have and will be described with reference to particular systems, with corresponding particular operations, embodiments of the present invention should not be limited thereto. Aspects of the invention may be accomplished through varying systems and varying operations.

In the illustrated operation S202, a moving picture capturing system 20 begins to capture a moving picture. In operation S204, the moving picture capturing system 20 may encode the captured moving picture. In operation S204, the captured moving picture may be encoded together with the first and second biometric signals. In operation S206, the result of the encoding performed in operation S204 may be stored. In the illustrated operation S102, a playback system 10 begins to play back the stored moving picture. In operation S104, the playback system 10 may extract, using a predetermined algorithm, an event section that reflects the user's interest and is desired by the user, from a noise section that is set according to the first and second biometric signals provided by the biometric signal sensing system 30. The setting of a noise section and the extraction of an event section from the noise section will be described later in more detail with reference to FIGS. 6 through 8.

In operation S106, after the extraction of the event section, the playback system 10 may edit the moving picture by indexing the event section in synchronization with a playback section of the moving picture, for example. In operation S108, the playback system 10 may play back the edited moving picture so that the user can watch the edited moving picture.

Figure 2:
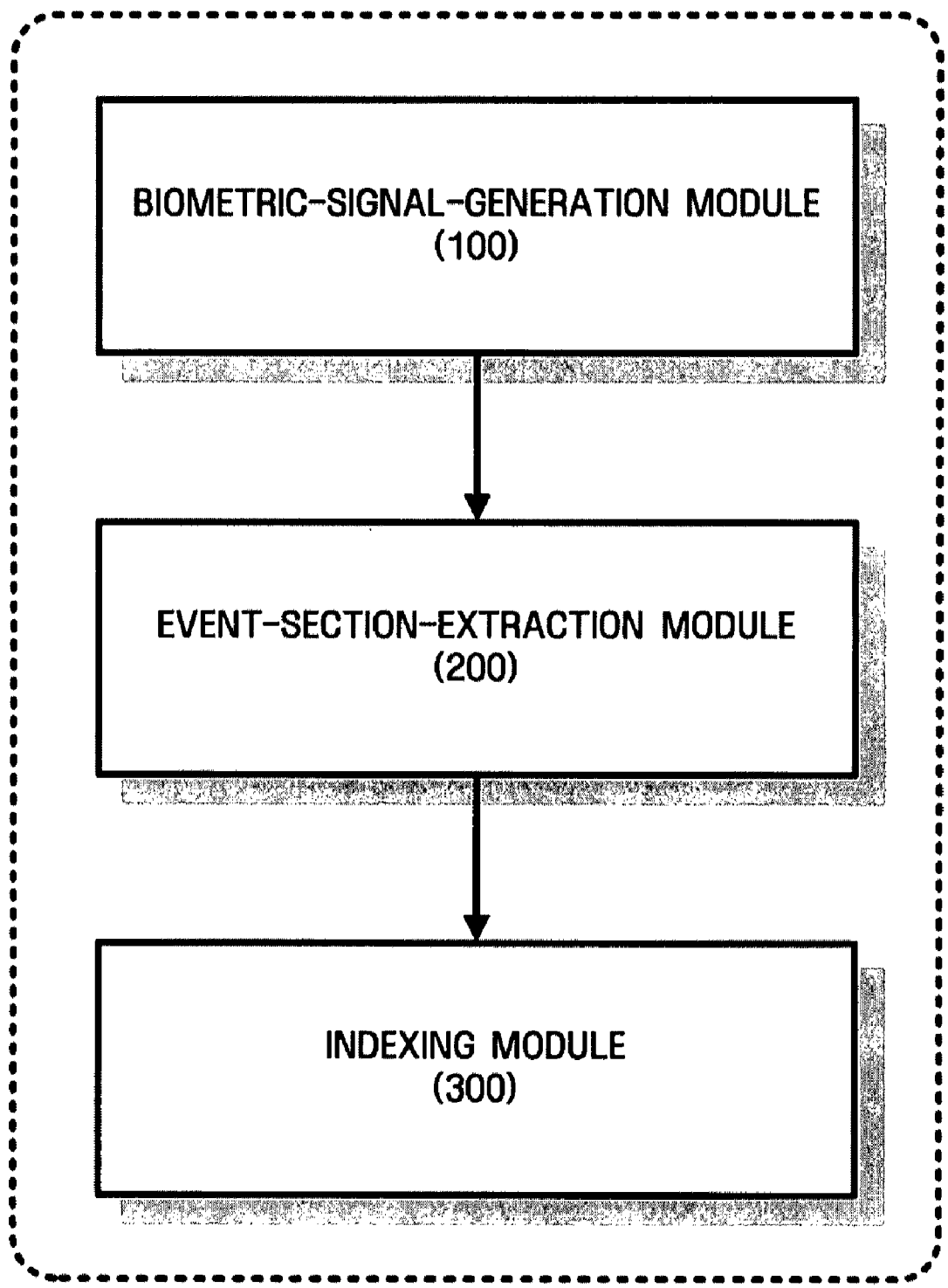
FIG. 2 illustrates a system editing a moving picture using biometric signals according to an embodiment of the present invention.

FIG. 2 illustrates a system for editing a moving picture using biometric signals according to an embodiment of the present invention. Referring to FIG. 2, the system may include a biometric signal generation module 100, an event section extraction module 200, and an indexing module 300, for example.

The biometric signal generation module 100 may use two, for example, types of sensors to sense a first biometric signal and a second biometric signal that reflect the emotional state of a user during an event that draws the user's attention, while the user captures a moving picture. The first biometric signal may be a signal sensed by a photoplethysmography (PPG) sensor, for example, and the second biometric signal may be a signal sensed by a galvanic skin response (GSR) sensor, for example.

A PPG sensor detects variations in the amount of blood flow in blood vessels that reflect the systolic and diastolic phases of the heart by irradiating infrared (IR) light to a predetermined portion of the human body. In detail, an IR emitter of a PPG sensor emits IR light onto a person's finger.

Then, some of the IR light is absorbed by blood in the finger of the person, and the remaining IR light is reflected by the finger of the person. The reflected IR light is detected by an IR receiver of the PPG sensor. In this manner, a PPG sensor can measure variations in the amount of blood flow in blood vessels. A PPG sensor uses IR light to measure blood flow variations because IR light is easily absorbed by blood, but rarely absorbed by surrounding tissues.

A GSR sensor records changes in the activity of the sweat glands according to changes in the emotional state of a user. In other words, a GSR sensor detects a biometric signal from a user by applying an alternating current to the skin of the user and measuring skin resistance variations and perspiration, for example. This type of measurement method sensitively responds to instantaneous external impulses and reflects the degree of perspiration associated with nerve control.

Figure 3:
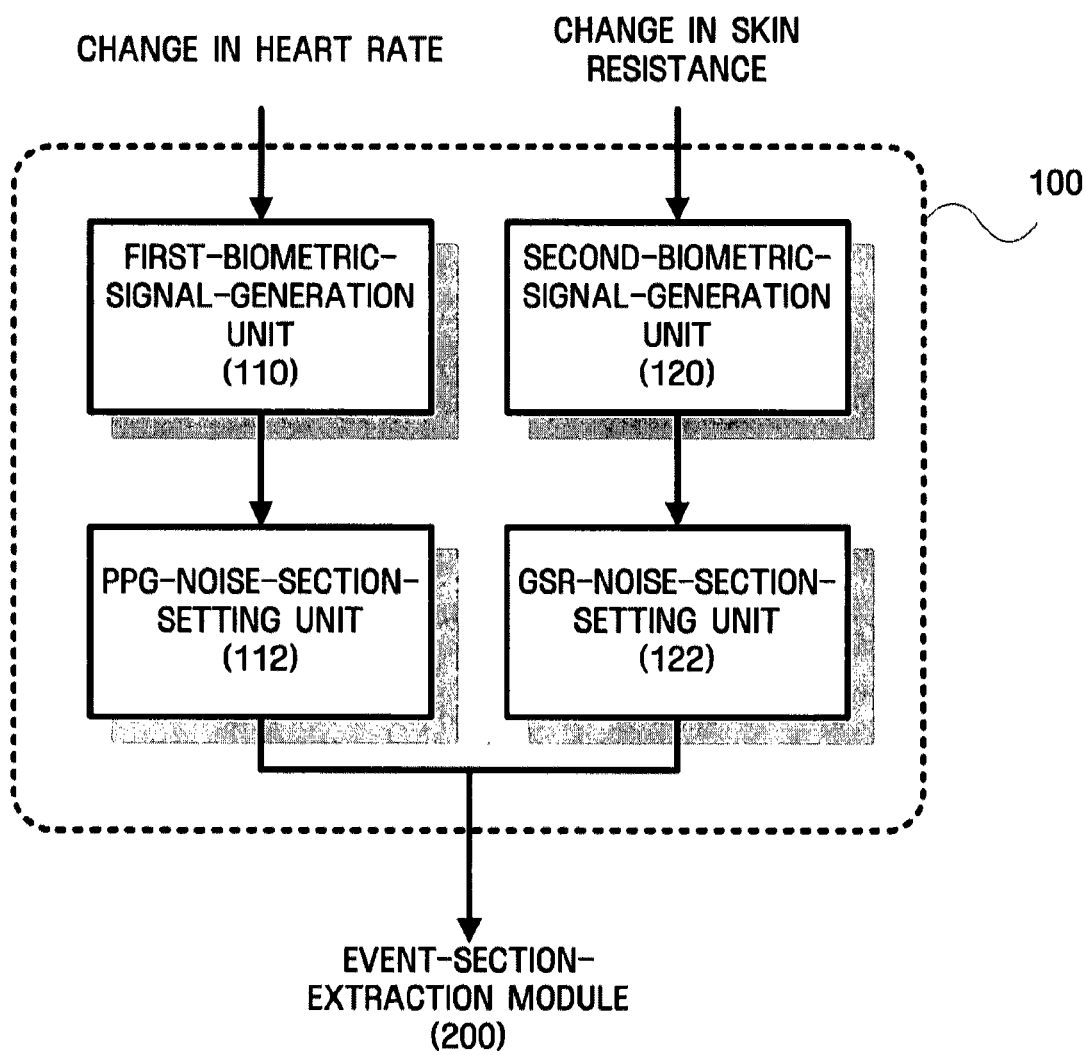
FIG. 3 illustrates a biometric signal generation module, such as that illustrated in FIG. 2 according to an embodiment of the present invention.

FIG. 3 illustrates the biometric signal generation module 100, such as that illustrated in FIG. 2, according to an embodiment of the present invention. Referring to FIG. 3, the biometric signal generation module 100 may include a first biometric signal detection module unit 110, which detects variations in the heart rate of a user, a PPG noise section setting unit 112, which sets a noise section according to the results of the detection performed by the first biometric signal detection module unit 110, a second biometric signal detection unit 120, which detects variations in the skin resistance of the user, and a GSR noise section setting unit 122, which sets a noise section according to the results of the detection performed by the second biometric signal detection module unit 120, for example.

The first biometric signal detection unit 110 generates a first biometric signal, for example, PPG data, using a PPG sensor that is placed in contact with the skin of the user, by performing filtering and amplification using a low pass filter (LPF) and performing analog-to-digital (A/D) conversion using an A/D conversion circuit. Thereafter, the first biometric signal detection unit 110 may detect peaks of the PPG data, and detect the interval between the detected peaks, e.g., a RR interval.

The second biometric signal detection unit 120 generates a second biometric signal, for example, GSR data, using a GSR sensor that is placed in contact with the skin of the user, by performing filtering and amplification using an LPF and a high pass filter and performing A/D conversion using an A/D conversion circuit. According to an embodiment, the second biometric signal detection unit 120 may generate the GSR data as SIL data and SIR data, for example. SIL data indicates absolute skin resistance measured as a signal, and SIR data indicates the rate of change in the SIL data over time.

Figure 4:
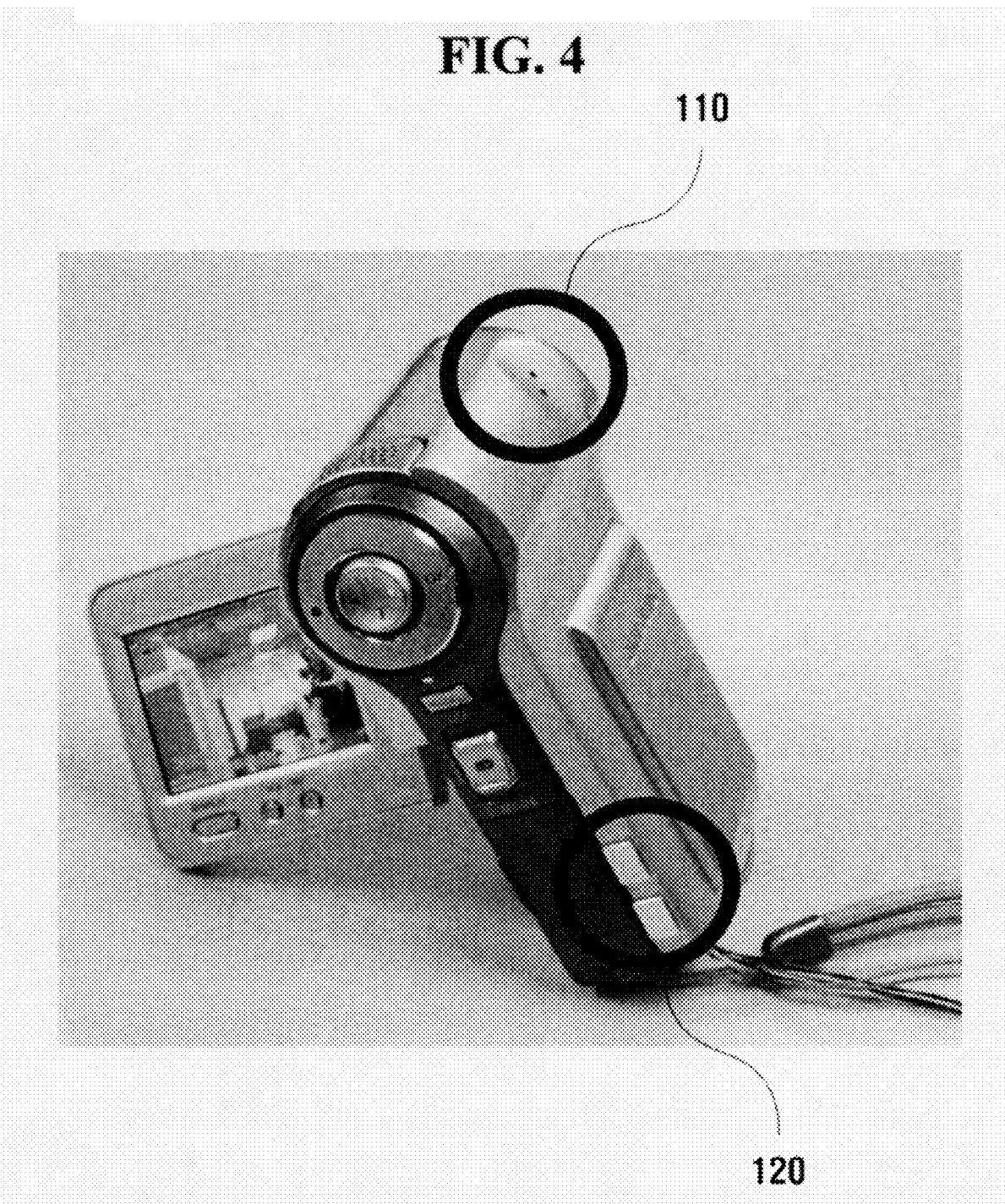
FIG. 4 illustrates a mobile digital device equipped with the biometric signal generation module, such as that illustrated in FIG. 3 according to an embodiment of the present invention.

The PPG sensor and the GSR sensor may be attached to a digital device that captures a moving picture, for example, as illustrated in FIG. 4. FIG. 4 illustrates a mobile digital device equipped with the biometric signal generation module 100, such as that illustrated in FIG. 3. Referring to FIG. 4, the first biometric signal detection module 110 may be attached onto an upper portion of the mobile digital device, and the second biometric signal detection unit 120 may be attached to a lower portion of the mobile digital device. However, the present invention is not limited to this, and accordingly, the biometric signal generation module 100 may be attached to a portion of the mobile digital device other than those set forth herein.

Referring to FIG. 3, the PPG noise section setting unit 112 may set a PPG noise section using the PPG data generated by the first biometric signal detection unit 110, and the GSR noise section setting unit 122 may set a GSR noise section using the GSR data generated by the second biometric signal detection unit 120. Algorithms for setting a PPG noise section and a GSR noise section will be described below in more detail with reference to FIGS. 6 and 7.

Figure 6:
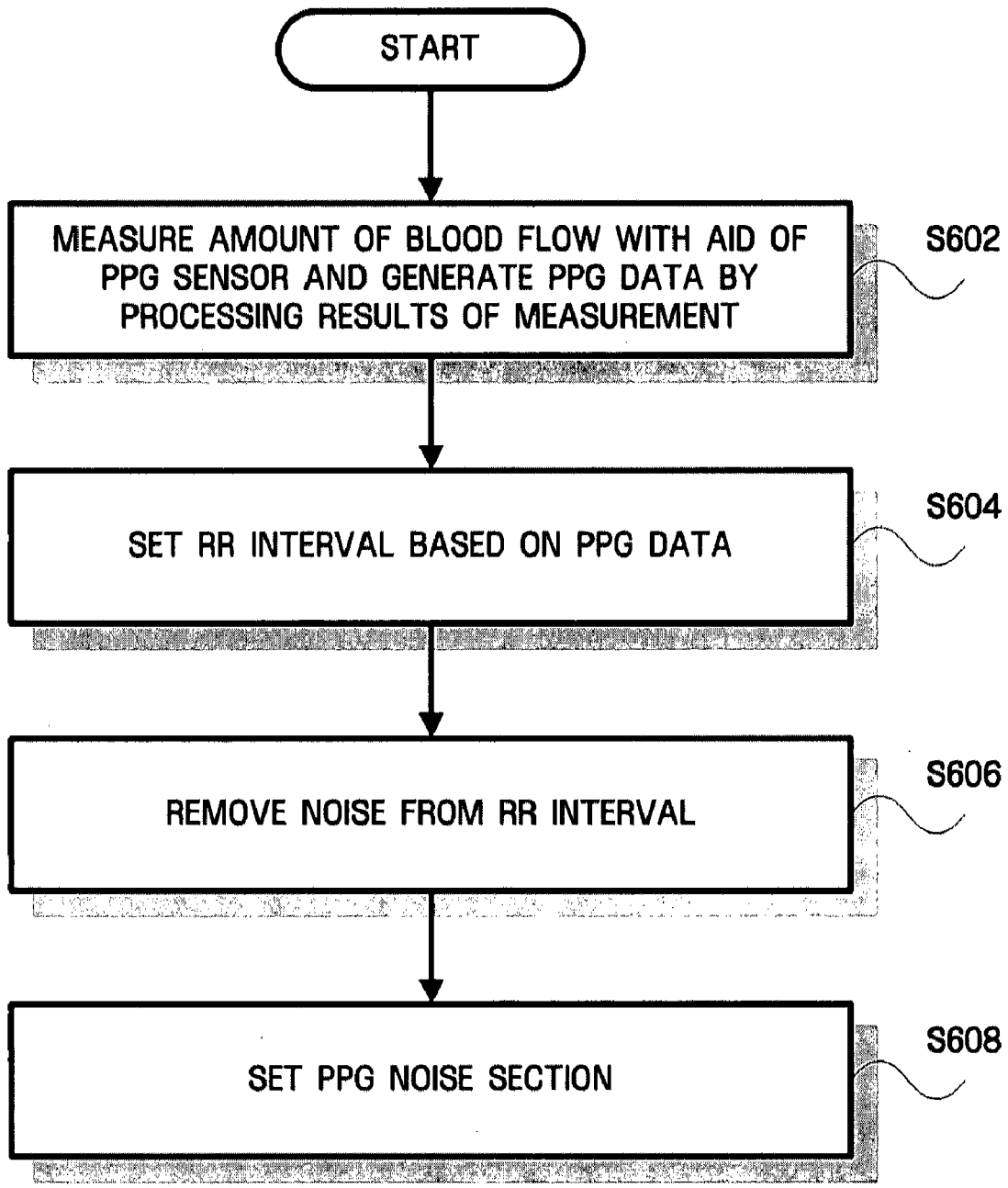
FIG. 6 illustrates an algorithm for setting a photoplethysmography (PPG) noise section according to an embodiment of the present invention.
Figure 7:
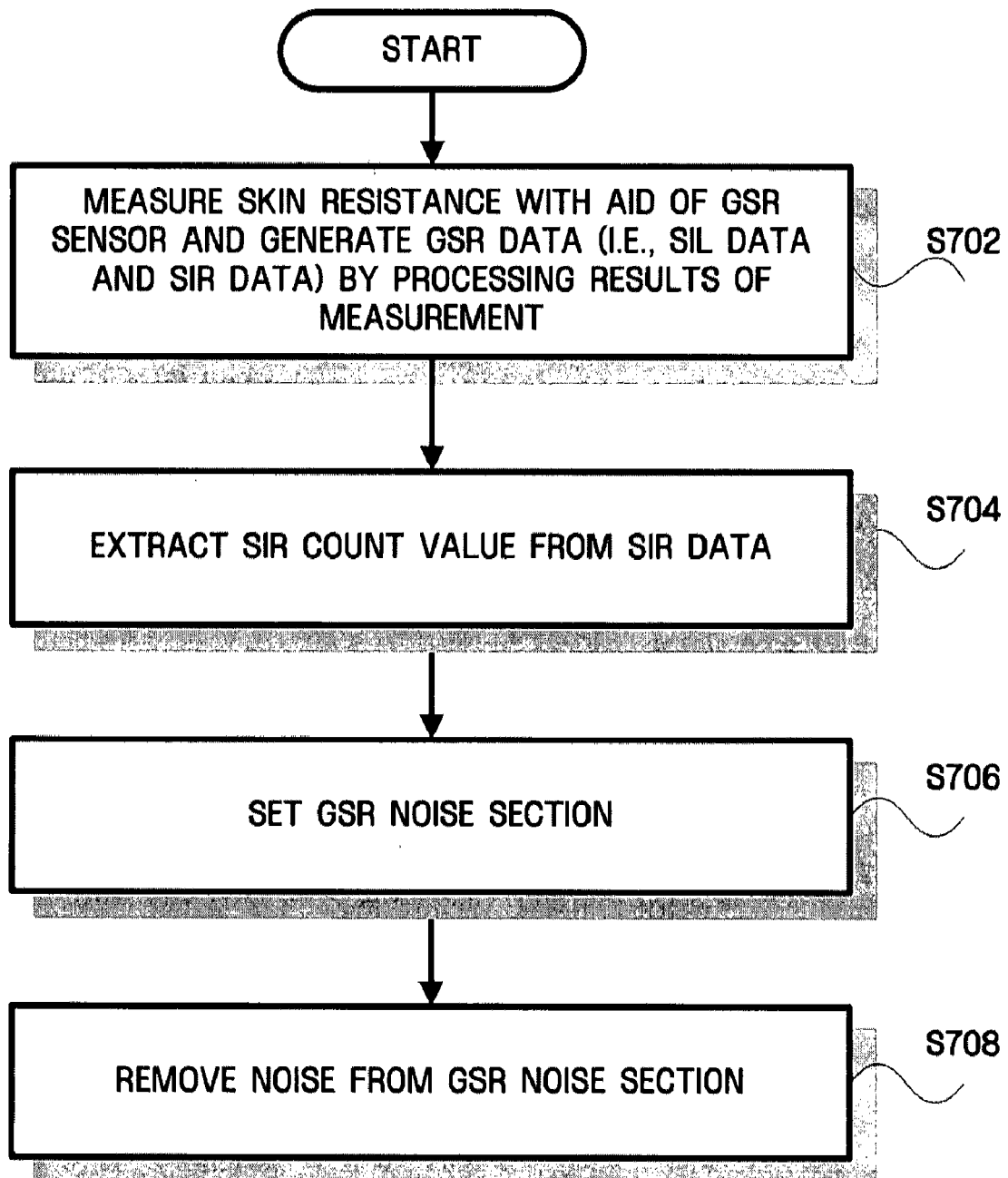
FIG. 7 illustrates an algorithm for setting a galvanic skin response (GSR) noise section according to an embodiment of the present invention.

FIG. 6 illustrates an algorithm for setting a PPG noise section according to an embodiment of the present invention, and FIG. 7 illustrates an algorithm for setting a GSR noise section according to an embodiment of the present invention.

Referring to FIG. 6, in operation S602, the first biometric signal detection unit 110, e.g., a PPG sensor, generates a first biometric signal, e.g., PPG data, by detecting a variation in the amount of blood flow according to a variation in the heart rate of a user as a signal, and appropriately processing the signal. In operation S604, the PPG sensor 110 may detect a RR interval, which is the interval between peaks detected from the PPG data. The determination of the RR interval has already been described above, and thus, a detailed description thereof will be omitted. In operation S606, the PPG sensor 110 may remove noise from the RR interval. In operation S608, the PPG sensor 110 may set the resulting RR interval as a PPG noise section. An example for the setting of the PPG noise section will be described in more detail below.

Imagine a two-dimensional (2D) coordinate plane with a vertical axis representing an RR interval and a horizontal axis representing the time of detection of the RR interval. Assuming that $RR(n)$ and $RR(n+1)$ respectively indicate n-th data and (n+1)-th data of the RR interval from which noise is removed and that $T\_RR(n)$ and $T\_RR(n+1)$ indicate the times of detection of the n-th RR interval data $RR(n)$ and the (n+1)-th RR interval data $RR(n+1)$, respectively, $RR(n)$ and $RR(n+1)$ can be represented on the vertical axis of the 2D coordinate plane, and $T\_RR(n)$ and $T\_RR(n+1)$ can be represented on the horizontal axis of the 2D coordinate plane.

In this case, if the difference between $T\_RR(n)$ and $T\_RR(n+1)$ is greater than the arithmetic average of $RR(n)$ and $RR(n+1)$ multiplied by a constant C, i.e., if $T\_RR(n+1)-T\_RR(n) > \{RR(n)+RR(n+1)\}/2*C$, the interval between $T\_RR(n)+RR(n)/2$ and $T\_RR(n+1)-RR(n+1)/2$ may be set as the PPG noise section. For example, when $RR(n)$ and $RR(n+1)$ are 0.5 and 0.6, respectively, and $T\_RR(n)$ and $T\_RR(n+1)$ are 100 and 102, respectively, $T\_RR(n+1)-T\_RR(n)=2$, and $\{RR(n)+RR(n+1)\}/2*C=0.55*C$. The constant may be between 1 and 3. In this case, $T\_RR(n+1)-T\_RR(n) > \{RR(n)+RR(n+1)\}/2*C$, and thus, the interval between 100+0.25 and 102−0.3 may be set as the PPG noise section.

Referring to FIG. 7, in operation S702, the second biometric signal detection unit 120, e.g., a GSR sensor, may measure variations in the skin resistance and the degree of perspiration of the user, and then generate a second biometric signal, e.g., GSR data comprising SIL data and SIR data, by amplifying the results of the measurement using an LPF and performing A/D conversion using an A/D converter. In operation S704, the GSR sensor 120 may extract a SIR count value indicating the number of peaks in the SIR data that exceed a predefined value from the SIR data of the GSR data, for example.

In operation S706, assuming that $SIL(t)$ indicates SIL data measured at a time t and that $\Delta t1$ and $\Delta t2$ respectively indicate first and second time intervals, a point where the difference between $SIL(t+\Delta t1)$ and $SIL(t)$ becomes greater than a first threshold Th1, i.e., a point where $SIL(t+\Delta t1)-SIL(t) > Th1$, may be set as the beginning of a GSR noise section, and a point where the difference between $SIL(t)$ and $SIL(t+\Delta t2)$ becomes greater than 0 but smaller than a second threshold Th2 and $SIL(t)$ becomes smaller than a third threshold Th3, e.g., a point where $0 < SIL(t)-SIL(t+\Delta t2) < Th2$ and $SIL(t) < Th3$, may be set as the ending of the GSR noise section. Here, the first threshold Th1, the second threshold Th2, and the third threshold Th3 may be different from one another, the first time interval $\Delta t1$ may be within the range of 0.1–0.5 sec, and the second time interval Δt2 may be within the rage of 0.2-1.0 sec. If the SIL data measured by the GSR sensor 120 ranges between 10 kΩ and 2 MΩ, the first threshold Th1 may be within the range of 20-60 kΩ, the second threshold Th2 may be within the range of 0-5 kΩ, and the third threshold Th3 may be higher than 2 MΩ. Accordingly, the beginning of the GSR noise section generally corresponds to a point where the SIL data begins to drastically increase, and the ending of the GSR noise section generally corresponds to a point where the SIL data begins to gently decrease. In operation S708, noise is removed from the SIR count value obtained in operation S704.

In the aforementioned manner, a PPG noise section and a GSR noise section may be set, and an event section may be extracted from the PPG noise section and the GSR noise section, respectively. In other words, referring to FIG. 2, the event section extraction module 200 may extract a first event section that reflects a user's preferences from a playback section of a moving image captured by the user according to a first biometric signal, e.g., PPG data, and may extract a second event section from the playback section of the moving image according to a second biometric signal, e.g., GSR data.

Thereafter, the event section extraction module 200 may create a final event section based on the first and second event sections. The structure of the event section extraction module 200 will hereinafter be described in greater detail with reference to FIG. 5, and then the creation of a final event section by the event section extraction module 200 will be described in greater detail with reference to FIG. 8.

Figure 5:
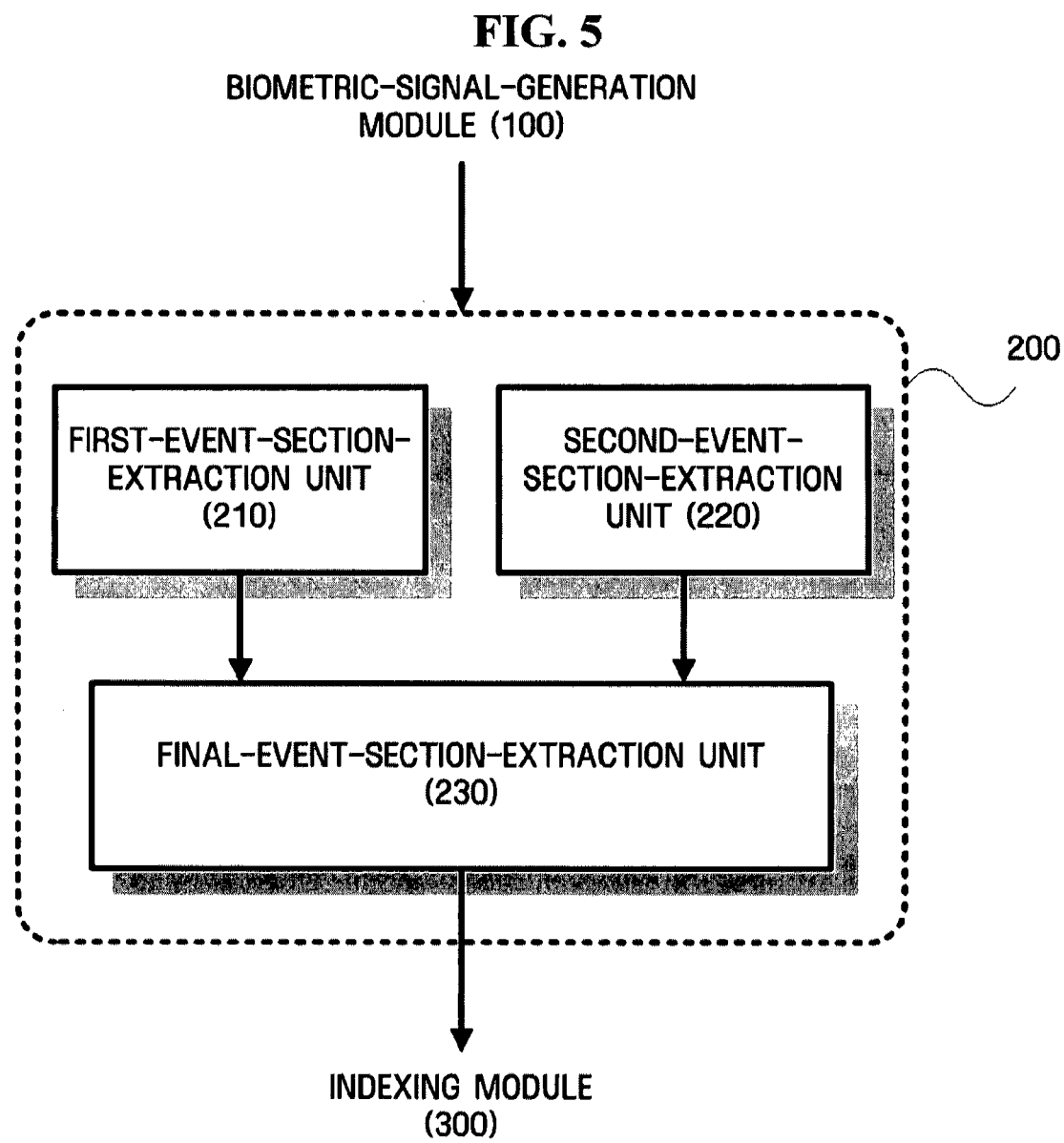
FIG. 5 illustrates an event section extraction module, such as that illustrated in FIG. 2, according to an embodiment of the present invention.
Figure 8:
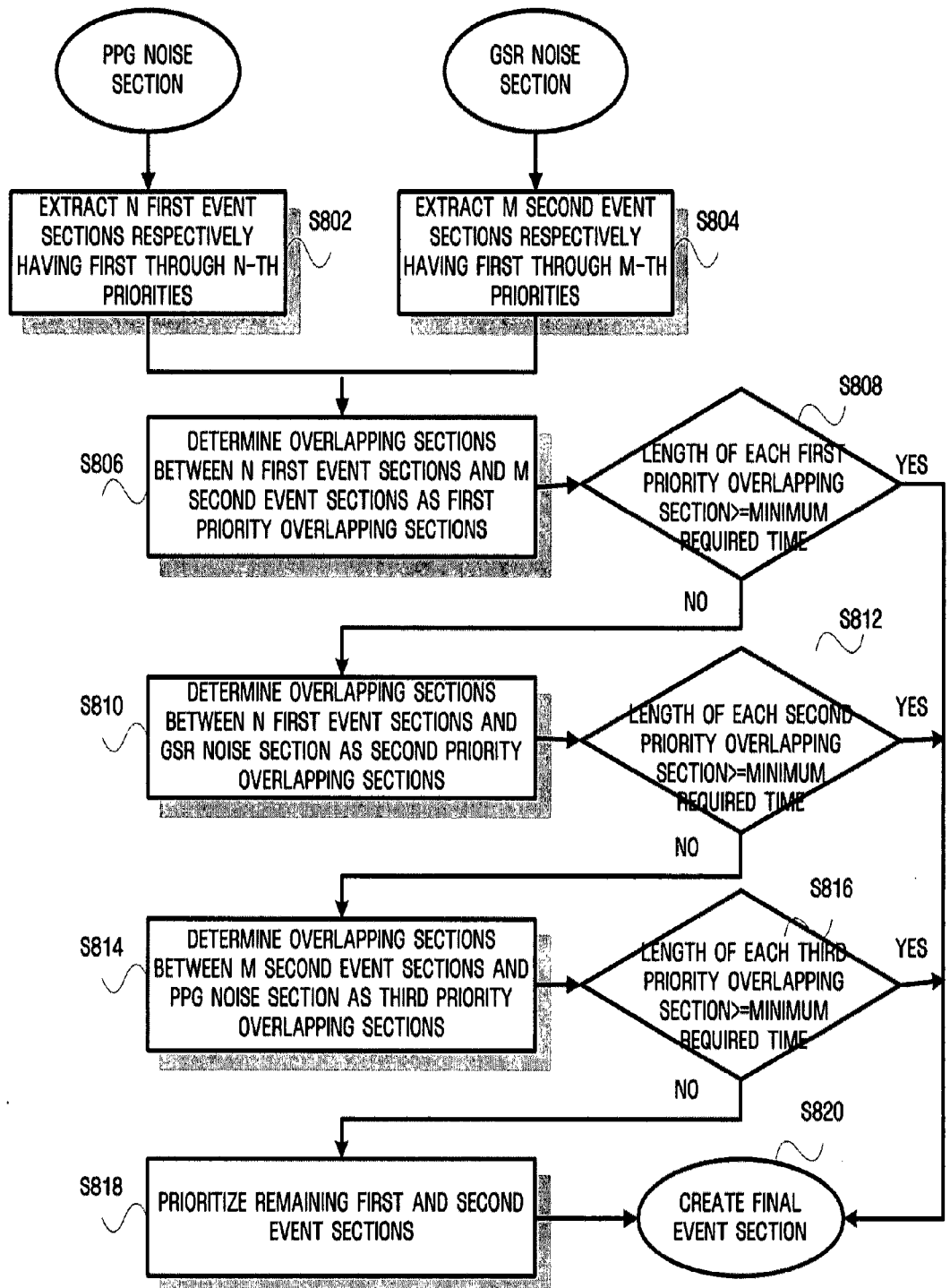
FIG. 8 illustrates an algorithm for creating a final event section according to an embodiment of the present invention.

FIG. 5 illustrates the event section extraction module 200, such as that illustrated in FIG. 2, and FIG. 8 illustrates an algorithm for creating a final event section according to an embodiment of the present invention. Referring to FIG. 5, the event section extraction module 200 may include a first event section extraction unit 210, a second event section extraction unit 220, and a final event section extraction unit 230, for example.

Referring to FIG. 8, in operation S802, the first event section extraction unit 210 may sequentially extract n first event sections respectively having first through n-th priorities from PPG data of a PPG noise section. In operation S804, the second event section extraction unit 220 may sequentially extract m second event sections respectively having first through m-th priorities from GSR data of a GSR noise section. In the present embodiment, a first event section corresponds to a predetermined time interval including the time of detection of a peak PPG data value, and a second event section corresponds to a time interval including the time of detection of a SIR count value higher than a SIR threshold, which is obtained by subtracting a predetermined value from a maximum SIR data value, although other embodiments are equally available. The creation of a final event section based on a first event section and a second event section will hereinafter be described in further detail with reference to FIG. 9.

Figure 9:
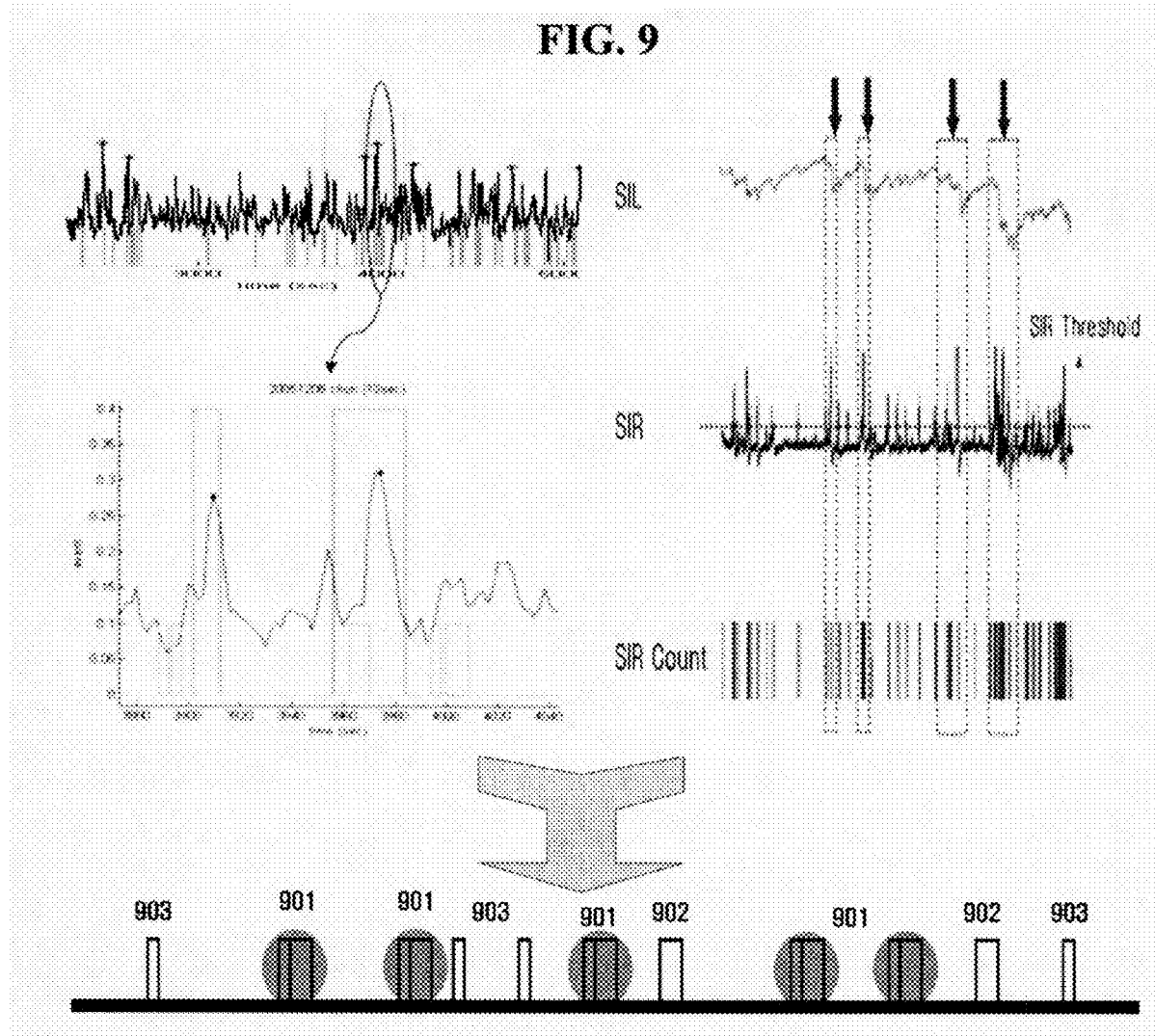
FIG. 9 illustrates the creation of a final event section using a first event section and a second event section according to an embodiment of the present invention.

The upper left view of FIG. 9 illustrates the extraction of a first event section, as an example. During the extraction of a first event section, a variety of parameters may be used. Examples of the parameters include heart rate (HR); a high frequency (HF) spectral component and a low frequency (LF) component of heartbeat fluctuations; HF/LF ratio, which is a measure of activation of the human body; SDNN03, which is a standard deviation of heartbeat intervals within three seconds; and SDNN10, which is a standard deviation of heartbeat intervals within ten seconds. HF is a power spectrum density (PSD) of a 0.15 hz-to-0.4 hz frequency domain and is considered an index of activation of the parasympathetic nerves. Variations in HF over time can be measured using a short Time Fourier Transform (STFT) method, for example.

LF is a PSD of a 0.04-to-0.15 hz frequency domain and is considered as an index of activation of the sympathetic nerves. Variations in LF over time can be measured using the STFT method, for example. Experiments were conducted to determine which of the aforementioned parameters may be optimal, and the results of the experiments indicate that SDNN10 may be considered optimal. Thus, according to an embodiment, SDNN 10 may used to set a first event section, although alternative embodiments are equally available.

In detail, a first event section may commence at a time interval starting 20 seconds before a peak SDNN 10 value is detected, and 4 seconds after the time of detection of the peak SDNN 10 value. The first event section may be set to be asymmetrical with respect to the time of detection of the peak SDNN 10 value because a physiological response to a user's action is detected by a PPG sensor a predetermined time after the user's action. Data obtained by the PPG sensor may be deemed as an indicator of whether a first event has occurred because it allows comparison between the physical state of a user in ordinary situations and the physical state of the user when the heart rate of the user changes because of the occurrence of the first event, for example. Accordingly, it is possible to determine whether the first event has occurred simply by referencing the pattern of the first biometric signal.

The upper right view of FIG. 9 illustrates the extraction of a second event section. A SIR threshold may be determined by subtracting a predetermined value from a maximum SIR count value. Then, a time interval including the time of detection of a SIR count value higher than the SIR threshold may be set as a second event section. In other words, the SIR threshold may be determined based on the average and the standard deviation of SIR data obtained during a predetermined time interval, and the SIR count value indicates the number of SIR data higher than the SIR threshold.

The GSR sensor may be used to address the problem of the PPG sensor's noise vulnerability. In other words, the GSR sensor may be used to address the problem that an event signal may be removed when noise is removed from a signal provided by the PPG sensor.

Referring to FIG. 8, in operation S806, the final event section extraction module 230 may determine the overlapping sections between the n first event sections and the m second event sections as first priority overlapping sections, for example. In operation S808, the final event section extraction module 230 may determine whether each of the first priority overlapping sections is longer than a minimum required time set by the user. In operation S820, the final event section extraction module 230 may determine a first priority overlapping section longer than the minimum required time as a final event section. Referring to the lower view of FIG. 9, reference numeral 901 indicates a first priority overlapping section that comprises the combination of a first event section (e.g., a PPG section) and a second event section (e.g., GSR section), as an example.

In operation S810, if none of the first priority overlapping sections are determined in operation S808 to be longer than the minimum required time, the final event section extraction module 230 may determine the overlapping sections between the n first event sections and the GSR noise section as second priority overlapping sections. In operation S812, the final event section extraction module 230 may determine whether each of the second priority overlapping sections is longer than the minimum required time. In operation S820, the final event section extraction module 230 may determine whether a second priority overlapping section is longer than the minimum required time as a final event section. Referring to the lower view of FIG. 9, reference numeral 902 indicates a second priority overlapping section that only includes a first event section (e.g., a PPG section).

Likewise, in operation S814, if none of the second priority overlapping sections are determined in operation S812 to be longer than the minimum required time, the final event section extraction module 230 may determine the overlapping sections between the m second event sections and the PPG noise section as third priority overlapping sections. In operation S816, the final event section extraction module 230 may determine whether each of the third priority overlapping sections is longer than the minimum required time. In operation S820, the final event section extraction module 230 may determine a third priority overlapping section longer than the minimum required time as a final event section. Referring to the lower view of FIG. 9, reference numeral 903 indicates a third priority overlapping section that only includes a second event section (e.g., a GSR section).

In operation S818, if none of the third priority overlapping sections are determined in operation S816 to be longer than the minimum required time, the final event section extraction module 230 may prioritize the remaining first and second event sections that are left to be generated as final event sections. In operation S820, the final event section extraction module 230 may determine the remaining first or second event section with the highest priority as a final event section according to the results of the prioritization performed in operation S818.

GSR sensors measure variations in skin resistance and the degree of perspiration of a user and sensitively respond to instantaneous external impulses. Therefore, GSR sensors are useful for determining the physical state of a user that readily varies when an event occurs. In addition, GSR sensors are robust against noise. Thus, it is possible to stably extract an event section that is created as a result of the action of the sympathetic nervous system by using a PPG sensor and a GSR sensor together. In addition, it is possible to properly reflect instantaneous variations in the physical state of a user, and to address the problem that an event section is removed when noise removal is performed, by using a PPG sensor and a GSR sensor together.

Referring to FIG. 2, the indexing module 300 may index a final event section created by the final event section extraction module 230 in synchronization with a playback section of a moving picture captured by a user, thereby enabling the edition and playback of the moving picture according to the user's preferences, for example.

The term 'module', as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

In addition to this discussion, embodiments of the present invention can also be implemented through software such as computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. Here, the medium may further be a signal, such as a resultant signal or bitstream, according to embodiments of the present invention. The media may also be a distributed network, so that the computer readable code is stored/transferred and executed in a distributed fashion. Still further, as only a example, the processing element could include a processor or a computer processor, and processing elements may be distributed and/or included in a single device.

According to one or more embodiments of present invention, it is possible to create an event section, even based on a section containing noise, to enhance the performance of the extraction of an event section, and to effectively restore an event section included in a noise section by using a PPG sensor and a GSR sensor, having different generation mechanisms, together.

In addition, according to one or more embodiments of the present invention, it is possible to estimate a noise section using a PPG sensor and a GSR sensor together and then use the noise section as an indicator for creating a user event section. Moreover, it is possible to create a final event section by prioritizing a plurality of extracted event sections.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A system editing a moving picture using biometric signals, the system comprising a processor and processor-executable modules comprising:
    a biometric signal generation module to measure signals that reflect an emotional state of a user who captures a moving picture, and to generate a first and a second biometric signal based on the measured signals;
    an event section extraction module to extract a first event section that reflects preferences of the user from a playback section of the moving picture based on the first biometric signal, extract a second event section that reflects preferences of the user from the playback section of the moving picture based on the second biometric signal, and extract a final event section based on where the first and second event sections overlap each other; and
    an indexing module, controlled by the processor, to edit the moving picture such that the final event section is indexed in synchronization with the playback section of the moving picture.

2. The system of claim 1, wherein the signals that reflect the emotional state of the user comprise a signal that reflect variations in the amount of blood flow resulting from variations in the heart rate of the user and a signal that reflects variations in the skin resistance and the degree of perspiration of the user.

3. The system of claim 1, wherein the first biometric signal is generated by a photoplethysmograghy (PPG) sensor, and the second biometric signal is generated by a galvanic skin response (GSR) sensor, wherein the PPG sensor and the GSR sensor are attached to a portion of a digital device configured to capture the moving picture.

4. The system of claim 3, wherein the biometric signal generation module comprises:
   a first biometric signal generation unit to generate the first biometric signal using the PPG sensor that is placed in contact with the skin of the user;
   a second biometric signal generation unit to generate the second biometric signal using the GSR sensor that is placed in contact with the skin of the user;
   a PPG noise section setting unit to set a PPG noise section using PPG data, for the first biometric signal; and
   a GSR noise section setting unit to set a GSR noise section using GSR data, for the second biometric signal.

5. The system of claim 4, wherein the PPG noise section setting unit sets an RR interval which is a time interval between peaks in the PPG data, removes noise from the RR interval, and sets a time interval between $T\_RR(n)+RR(n)/2$ and $T\_RR(n+1)-RR(n+1)12$ (where $RR(n)$ indicates n-th data of the RR interval, $T\_RR(n)$ indicates the time of detection of $RR(n)$, $RR(n+1)$ indicates $(n+1)$-th data of the RR interval, and $T\_RR(n+1)$ indicates the time of detection of $RR(n+1)$) as the PPG noise section if $T\_RR(n+1)-T\_RR(n) > \{RR(n)+RR(n+1)\}/2°$ C. (where C is a constant between 1 and 3).

6. The system of claim 4, wherein the GSR data comprises SIL data which indicates absolute skin resistance measured as a signal and SIR data which indicates the rate of change in the SIL data over time, and the GSR noise section setting module extracts a SIR count value indicating the number of peaks in the SIR data from the SIR data, sets a point where $SIL(t+\Delta t1)-SIL(t) > Th1$ (where $SIL(t)$ indicates SIL data measured at a time t, $\Delta t1$ indicates a predetermined time interval, and Th1 indicates a first threshold) as a beginning point of the GSR noise section, sets a point where $0<SIL(t)-SIL(t+\Delta t2)<Th2$ and $SIL(t)<Th3$ (where $\Delta t2$ indicates a predetermined time interval and Th2 and Th3 respectively indicate second and third thresholds) as an ending point of the GSR noise section, and then removes noise from the GSR noise section.

7. The system of claim 6, wherein $\Delta t1$ is within the range of 0.1-0.5, $\Delta t2$ is within the range of 0.2-1.0, and Th1 is within the range of 20-60 k$\Omega$, Th2 is within the range of 0-5 k$\Omega$, and Th3 is higher than 2M$\Omega$ when the SIL data ranges between 10 k$\Omega$ and 2 M$\Omega$.

8. The system of claim 3, wherein the event section extraction module comprises:
   a first event section extraction unit to extract n first event sections respectively having first through n-th priorities from the PPG noise section;
   a second event section extraction unit to extract m second event sections respectively having first through m-th priorities from the GSR noise section; and
   a final event section extraction module to determine overlapping sections between the n first event sections and the m second event sections as first priority overlapping sections, and to extract a first priority overlapping section that is longer than a minimum required time set by the user as the final event section.

9. The system of claim 8, wherein, if none of the first priority overlapping sections are longer than the minimum required time, the final event section extraction module determines overlapping sections between the n first event sections and the GSR noise section as second priority overlapping sections and extracts a second priority overlapping section that is longer than the minimum required time as the final event section.

10. The system of claim 9, wherein, if none of the second priority overlapping sections are longer than the minimum required time, the final event section extraction module determines overlapping sections between the m second event sections and the PPG noise section as third priority overlapping sections, and extracts a third priority overlapping section that is longer than the minimum required time as the final event section.

11. The system of claim 10, wherein, if none of the third priority overlapping sections are longer than the minimum required time, the final event section extraction module prioritizes remaining first and second event sections to be generated as final event sections, and extracts the remaining first or second event section with a highest priority as the final event section.

12. The system of claim 3, wherein the first event section comprises a time interval including the time of detection of a peak in the first biometric signal, the second event section comprises a time interval including the time of detection of a SIR count value higher than a SIR threshold that is determined based on the average and the standard deviation of SIR data measured during a predetermined time interval.

13. The system of claim 1, wherein the captured moving picture is encoded together with the first and second biometric signals.

14. The system of claim 1, wherein the final event extraction module determines the overlapping section of the first and second event sections as the final event section when the overlapping section exceeds a minimum required time.

15. The method of claim 1, wherein the overlapping section of the first and second event sections is determined as the final event section when the overlapping section exceeds a minimum required time.

16. A method of editing a moving picture using biometric signals, the method comprising:
   measuring signals that reflect an emotional state of a user who captures a moving picture;
   generating, by way of a processor, a first and a second biometric signal based on the measured signals;
   extracting a first event section that reflects preferences of the user from a playback section of the moving picture based on the first biometric signal;
   extracting a second event section that reflects preferences of the user from the playback section of the moving picture based on the second biometric signal;
   extracting a final event section based on where the first and second event sections overlap each other; and
   editing the moving picture, by way of the processor, by indexing the final event section in synchronization with the playback section of the moving picture.

17. The method of claim 16, wherein the signals that reflect the emotional state of the user comprise a signal that reflect variations in the amount of blood flow resulting from variations in the heart rate of the user and a signal that reflects variations in the skin resistance and the degree of perspiration of the user.

18. The method of claim 16, wherein the first biometric signal is generated by a photoplethysmograghy (PPG) sensor, and the second biometric signal is generated by a galvanic skin response (GSR) sensor, wherein the PPG sensor and the GSR sensor are attached to a predetermined portion of a digital device capturing the moving picture.

19. The method of claim 18, wherein the measuring of the signals comprises:
   generating the first biometric signal using the PPG sensor that is placed in contact with the skin of the user, and generating the second biometric signal using the GSR sensor that is placed in contact with the skin of the user;

setting a PPG noise section using PPG data, wherein the PPG data is the first biometric signal; and setting a GSR noise section using GSR data, wherein the GSR data is the second biometric signal.

20. The method of claim 19, wherein the setting of the PPG noise section using PPG data comprises:

setting an RR interval which is a time interval between peaks in the PPG data;

removing noise from the RR interval; and setting a time interval between $T\_RR(n)+RR(n)/2$ and $T\_RR(n+1)-RR(n+1)/2$ (where $RR(n)$ indicates n-th data of the RR interval, $T\_RR(n)$ indicates the time of detection of $RR(n)$, $RR(n+1)$ indicates (n+1)-th data of the RR interval, and $T\_RR(n+1)$ indicates the time of detection of $RR(n+1)$) as the PPG noise section if $T\_RR(n+1)-T\_RR(n) > \{RR(n)+RR(n+1)\}/2*C$ (where C is a constant between 1 and 3).

21. The method of claim 19, wherein the GSR data comprises SIL data, which indicates absolute skin resistance measured as a signal and SIR data which indicates the rate of change in the SIL data over time, and the setting of the GSR noise section using GSR data comprises:

extracting a SIR count value indicating the number of peaks in the SIR data from the SIR data;

setting a point where $SIL(t+\Delta t1)-SIL(t) > Th1$ (where $SIL(t)$ indicates SIL data measured at a time t, $\Delta t1$ indicates a predetermined time interval, and $Th1$ indicates a first threshold) as a beginning point of the GSR noise section, and setting a point where $0<SIL(t)-SIL(t+\Delta t2)<Th2$ and $SIL(t)<Th3$ (where $\Delta t2$ indicates a predetermined time interval and $Th2$ and $Th3$ respectively indicate second and third thresholds) as an ending point of the GSR noise section; and removing noise from the GSR noise section.

22. The method of claim 21, wherein $\Delta t1$ is within the range of 0.1-0.5, $\Delta t2$ is within the range of 0.2-1.0, and $Th1$ is within the range of 20-60 k$\Omega$, $Th2$ is within the range of 0-5 k$\Omega$, and $Th3$ is higher than 2M$\Omega$ when the SIL data ranges between 10 k$\Omega$ and 2M$\Omega$.

23. The method of claim 18, wherein the extracting of the first event section comprises:

extracting n first event sections respectively having first through n-th priorities from the PPG noise section, and extracting m second event sections respectively having first through m-th priorities from the GSR noise section; and determining the overlapping sections between the n first event sections and the m second event sections as first priority overlapping sections, and extracting a first priority overlapping section that is longer than a minimum required time set by the user as the final event section.

24. The method of claim 23, wherein the extracting of the first event section further comprises:

if none of the first priority overlapping sections are longer than the minimum required time, determining overlapping sections between the n first event sections and the GSR noise section as second priority overlapping sections and extracting a second priority overlapping section that is longer than the minimum required time as the final event section;

if none of the second priority overlapping sections are longer than the minimum required time, determining overlapping sections between the m second event sections and the PPG noise section as third priority overlapping sections, and extracting a third priority overlapping section that is longer than the minimum required time as the final event section; and if none of the third priority overlapping sections are longer than the minimum required time, prioritizing remaining first and second event sections to be generated as final event sections, and extracting the remaining first or second event section with a highest priority as the final event section.

25. The method of claim 18, wherein the first event section comprises a time interval including the time of detection of a peak in the first biometric signal, the second event section comprises a time interval including the time of detection of a SIR count value higher than a SIR threshold that is determined based on the average and the standard deviation of SIR data measured during a predetermined time interval.

26. At least one medium comprising computer readable code to control at least one processing element to implement the method of claim 16.

27. The method of claim 16, wherein the captured moving picture is encoded together with the first and second biometric signals.

28. A moving picture capturing device editing a moving picture using biometric signals, the device including a processor and processor-executable modules comprising:

a first biometric sensor attached to a first portion of the moving picture capturing device and measuring a first biometric during capture of a moving picture;

a second biometric sensor attached to a second portion of the moving picture capturing device and measuring a second biometric during capture of the moving picture;

a biometric signal generation module generating a first and a second biometric signal based on the measured first and second biometrics;

an event section extraction module extracting a first event section that reflects preferences of the user from a playback section of the moving picture based on the first biometric signal, extracting a second event section that reflects preferences of the user from the playback section of the moving picture based on the second biometric signal, and extracting a final event section based on where the first and second event sections overlap; and an indexing module, controlled by the processor, to edit the moving picture such that the final event section is indexed in synchronization with the playback section of the moving picture.

* * * * *